(12) United States Patent
Huang

(10) Patent No.: US 6,210,001 B1
(45) Date of Patent: Apr. 3, 2001

(54) EYEGLASSES WITH LENSES EASILY CHANGEABLE

(75) Inventor: Jih-Hsing Huang, Tainan (TW)

(73) Assignee: Bo Shown Spectacles Industrial Co., Ltd., Tainan (TW)

( * ) Notice: Subject to any disclaimer, the term of this patent is extended or adjusted under 35 U.S.C. 154(b) by 0 days.

(21) Appl. No.: 09/540,560

(22) Filed: Mar. 31, 2000

(30) Foreign Application Priority Data

Sep. 1, 1999 (TW) .............................................. 088214928

(51) Int. Cl.⁷ ....................................................... G02C 1/00
(52) U.S. Cl. ................................................................ 351/86
(58) Field of Search .................................. 351/83, 86, 178

(56) References Cited

U.S. PATENT DOCUMENTS 4,504,127 * 3/1985 Cottet ...................................... 351/86
6,086,199 * 7/2000 Holland et al. ........................ 351/86

FOREIGN PATENT DOCUMENTS 2 123 574 * 2/1984 (GB) ...................................... 351/86

* cited by examiner

*Primary Examiner*—Huy Mai

(57) ABSTRACT

Eyeglasses with lenses easily changeable includes a stop edge formed respectively in an inner wall of two openings of a frame, plural position tabs formed on an upper edge of the inner wall of the openings, and a groove formed in the inner wall opposite to the position tabs. Then two lenses are respectively fitted in each opening and secured by the stop edge, the position tabs and the secure member. The secure member extends from a nose pad and has elasticity to move back and forth so as to press or set free one end of the lens to change it.

2 Claims, 4 Drawing Sheets

EYEGLASSES WITH LENSES EASILY CHANGEABLE

BACKGROUND OF THE INVENTION

This invention relates to eyeglasses with lenses easily changeable, particularly to one provided with a stop edge in an inner wall of each of two openings for two lenses, position tabs on an upper edge of the inner wall, and an elastic secure member extending from a nose pad to fit in a groove formed in the inner wall to keep a lens positioned stabilized in the opening. In changing the lens the secure member is only pushed inward to separate from the lens, and then the lens may be taken off the frame. So a different lens may be put in the opening and push the secure member to secure the new lens without need of any tools. Then any colored lens or of any degrees can be readily be used, very convenient.

A conventional fixing method of a lens with a frame is effected by a an opening provided in an outer end edge of the frame, and a fix base is respectively provided at two opposite sides of the opening, and screws are used to screw tightly the fix base to keep the lens stably in the opening. If the lens is needed to be taken off the frame or to replace with a new one, a tool, a driver, has to be used to screw loose the screw to let the lens loose enough to be taken off the frame. So a user cannot so easily take off the lens or put it on again. In addition, near-sighted or far-sighted eyeglasses often have to be changed to those of other degrees after a period of use. Then users have to buy a new one or have lenses changed by a professional optician.

Another conventional eyeglasses made of plastic have lenses fix in the frame formed integral by heating the lens in advance to fit therein. Then this kind of eyeglasses is impossible to change its lenses by users, even they want to change the lenses.

SUMMARY OF THE INVENTION

The objective of the invention is to offer eyeglasses with lenses easily changeable by users, needing not to depend on professional opticians.

The main feature of the invention is a stop edge formed in an inner wall of an opening for a lens, position tabs fixed on an annular edge of the opening, and a groove formed in the inner wall of the opening opposite to the position tabs for inserting a secure member to secure the lens in the opening.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
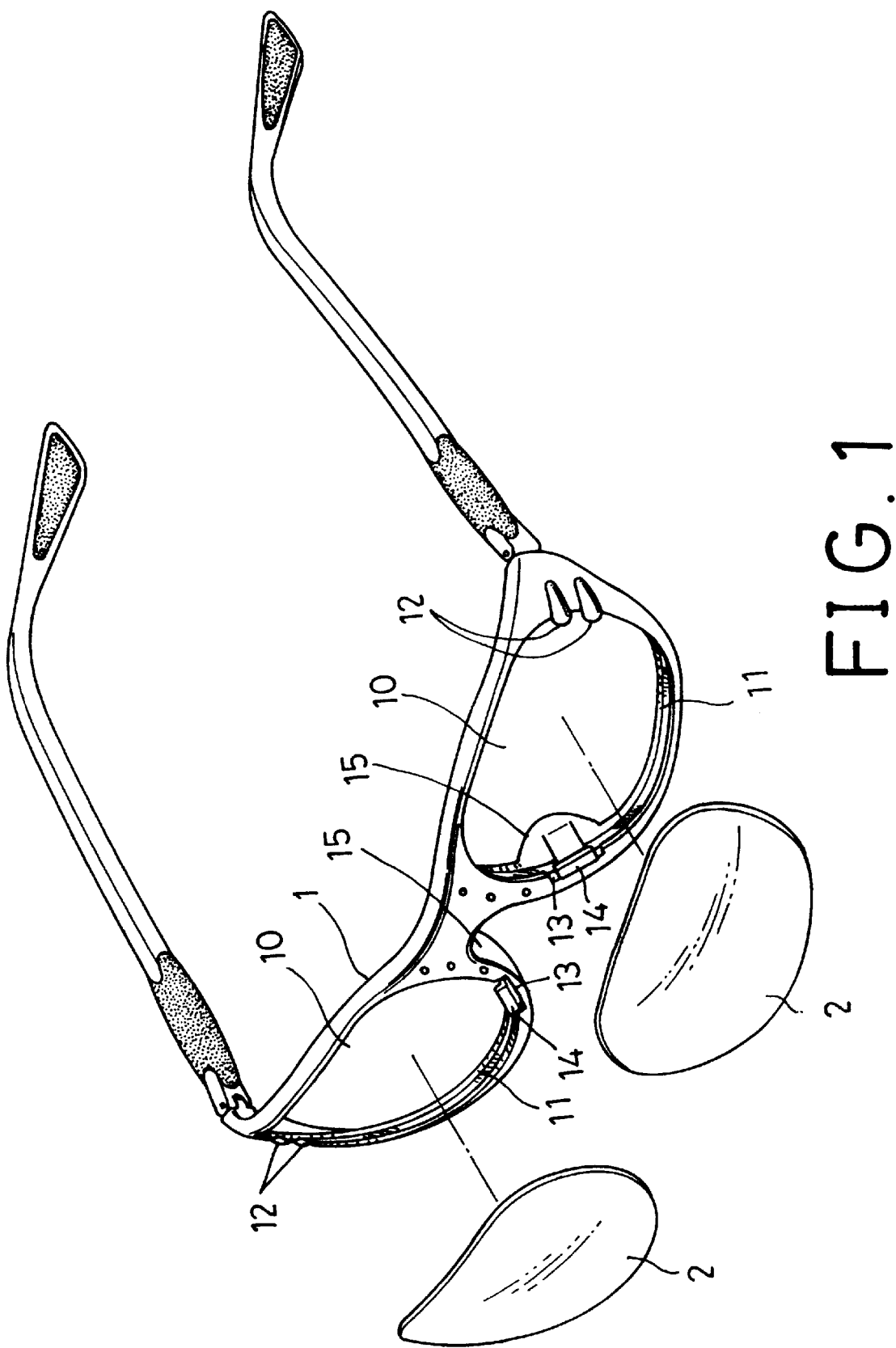
FIG. 1 is an exploded perspective view of eyeglasses with lenses easily changeable in the present invention.

A preferred embodiment of eyeglasses with lenses easily changeable in the present invention, as shown in FIG. 1, includes a stop edge 11 formed in an inner wall of each of two openings 10, plural position tabs 12 formed on annular edge of the opening 10 to secure a lens 2 and to look like a decoration. Further, a groove 13 is formed in the inner wall of each opening at an opposite point of the position tabs 12 to fit therein an elastic flexible secure member 14 extending from a nose pad 15, and a gap formed between the top of the secure member 14 and the groove 13. Two lenses 2 are fitted in the two openings 10.

Figure 2:
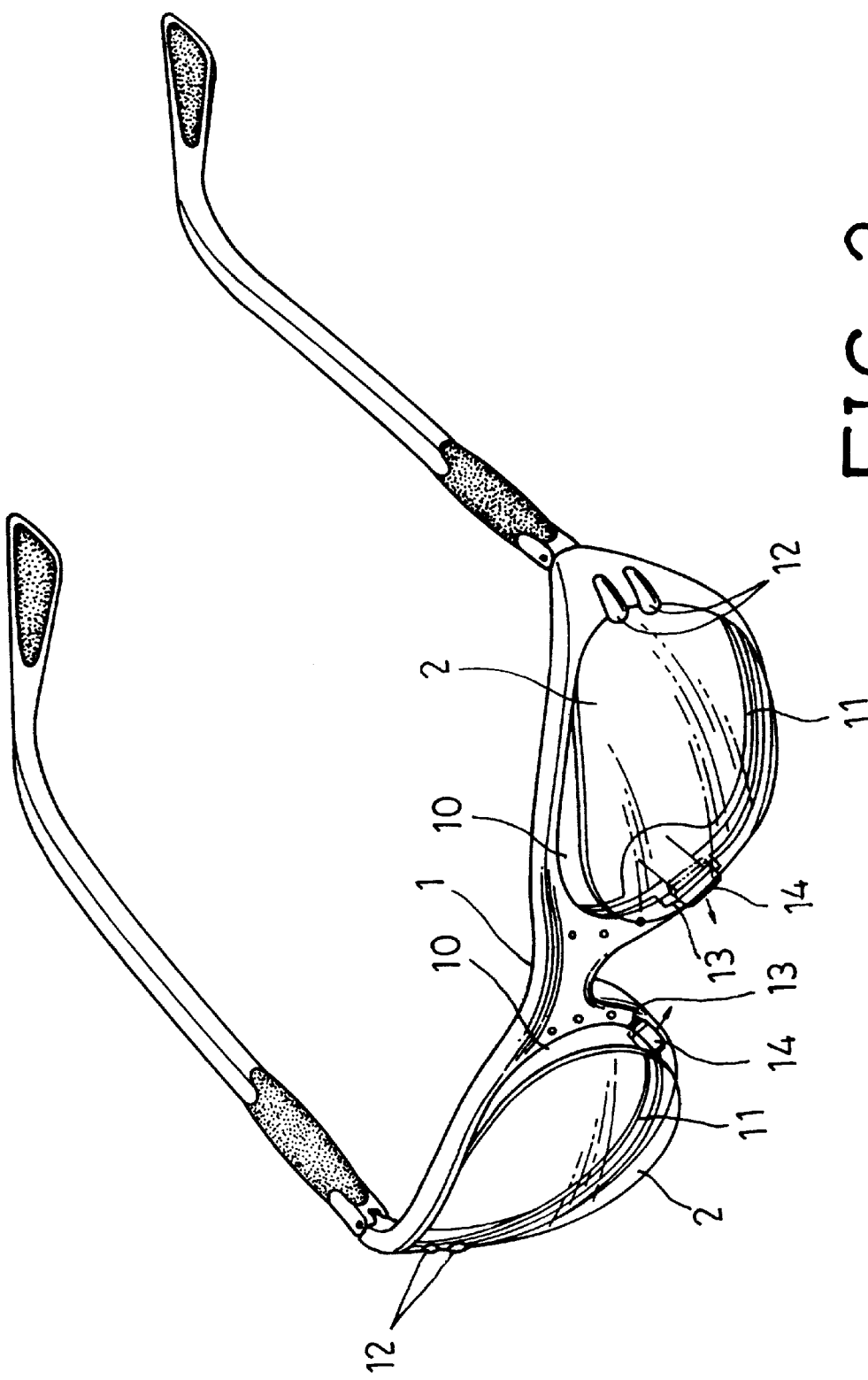
FIG. 2 is a perspective view of lenses having their edges inserted in stop edges of the frame and supported by position tabs in the present invention.
Figure 3:
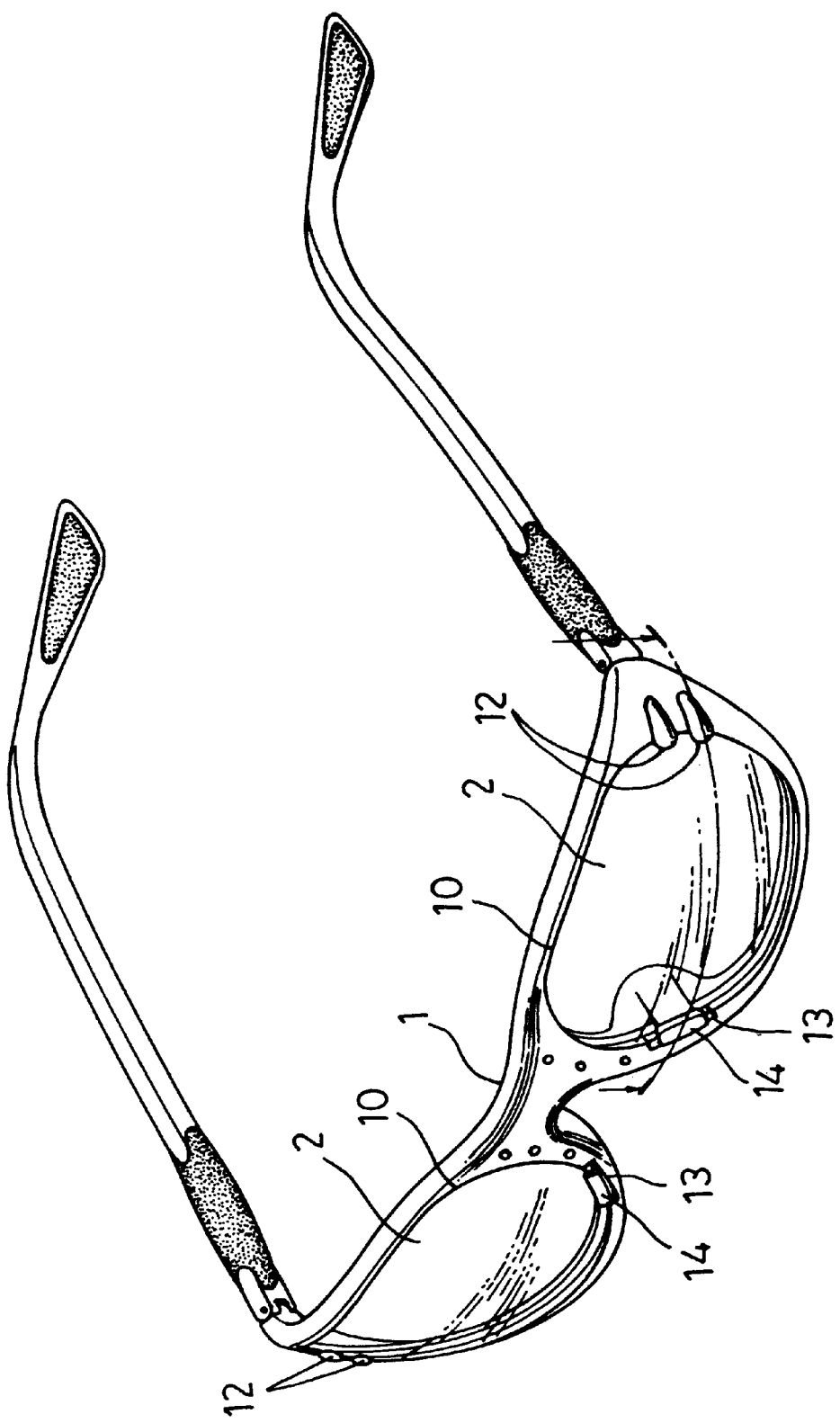
FIG. 3 is a perspective view of the lenses fixed in the frame of eyeglasses in the present invention.

In assembling and using the eyeglasses with lenses easily changeable in the invention, as shown in FIGS. 1, 2 and 3, first, one end of the lens 2 is fitted in one of the opening 10, letting the inner annular edge of the lens 2 stopped by the stop edge 11, and the outer wall end of the leans 2 is secured by the position tabs 12, as shown in FIG. 2. The secure member 14 is pressed elastically in the groove 13, not hampering the lens 2 from entering completely in the opening 10 and stopped by the whole stop edge 11, not leaving out of the frame 1, releasing the secure member 14 to recover its position to let its top press the outer edge of the lens 2. Then the lens 2 is completed in fitting in one of the openings 10 stabilized by means of the stop edge 11, the position tabs 12 and the secure member 14 with fastness and convenience.

Figure 4:
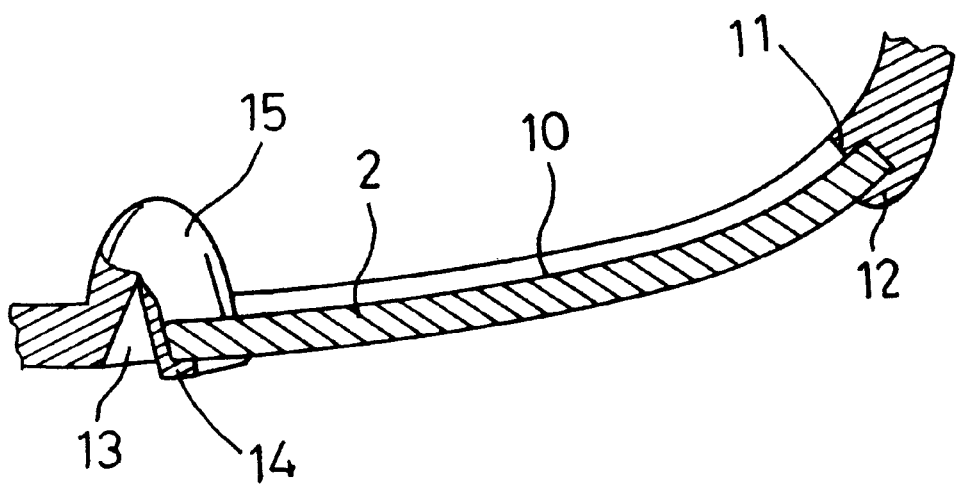
FIG. 4 is a cross-sectional view of a lens fixed in the frame in the present invention; and, FIG. 5 is a cross-sectional view of a lens being taken off the frame in the present invention.
Figure 5:
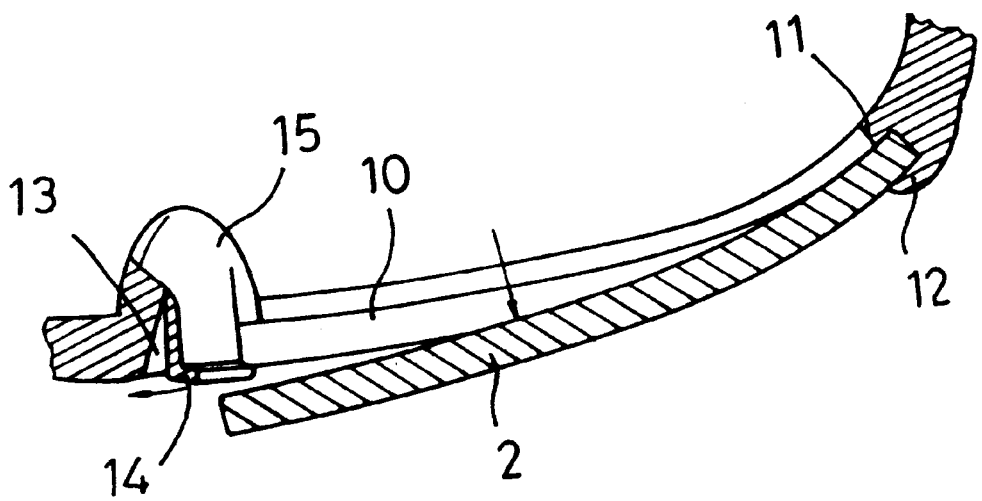

Provided that the lenses 2 are to be changed to different colored ones or different degree ones, as shown in FIGS. 3, 4 and 5, as described above, the nose pad is pressed to make the secure member 14 elastically move inward, to let free the lens 2, and then the lens 2 is pushed out to separate from the opening 10. Thus a user can easily change the lenses to those of his favorite color or of proper degrees.

The invention has the following advantages, as can be understood from the aforesaid description.

1. A user can choose favorite colored lenses or proper degree ones to wear.
2. In changing lenses, a user needs no tools to quickly fix on or take off lenses.

While the preferred embodiment of the invention has been described above, it will be recognized and understood that various modifications may be made therein and the appended claims are intended to cover all such modifications which may fall within the spirit and scope of the invention.

What is claimed is:

1. Eyeglasses with lenses easily changeable comprising a stop edge formed in an inner wall of each of two openings of a frame, plural position tabs formed on an upper edge of each said opening, a groove formed in the inner wall of each said opening opposite to said plural position tabs, and an elastic secure member fitted in said groove, two lenses fitted in said opening;

said stop edge, said position tabs and said secure member together securing each said lens stabilized in each said opening of said frame, said secure member pressed inward elastically to set free each said lens and be taken off each said opening so that a different lens may be fitted in each said opening without need of any tools.

2. The eyeglasses with lenses easily changeable as claimed in claim 1, wherein said secure member extends up from a nose pad.

* * * * *